Sheet 1-2 Sheets.

E. Hawks.

Heating Stove.

No. 3,436. Reissued May 11, 1869.

Section A.B.

Section A.B

Section E.F

Witnesses
A. F. Upperman
A. G. Flint

Inventor
Elizabeth Hawks
Assignee
Wm E. Marston
By Marcus P. Norton
Attorney of Record Sheet 2-2 Sheets.
E. Hawks.
Heating Stove.
No. 3,436. Reissued May 11, 1869.
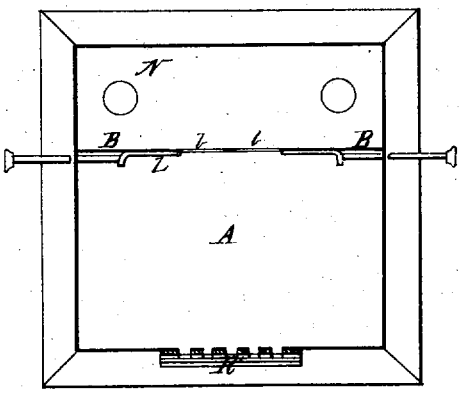
Fig 1 Base Section C.D
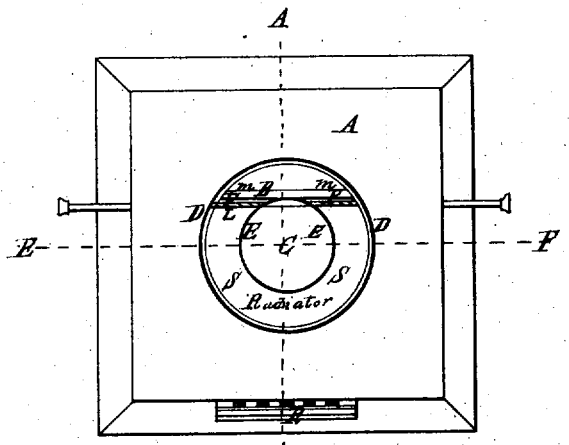
Fig 5 Section A.H
Witnesses
F. Hilpherman
H. P. Klunk
Inventor
Elizabeth Hawks
Wm. E. Marston
By Marcus P. Norton
Attorney of Record

United States Patent Office.

WILLIAM E. MARSTON, OF TROY NEW YORK, ASSIGNEE OF ELIZABETH HAWKS.

*Letters Patent No.* 84,626, *dated December* 1, 1868: *reissue No.* 3,436, *dated May* 11, 1869.

IMPROVEMENT IN HEATING STOVES.

The Schedule referred to in these Letters Patent and making part of the same.

*To all whom it may concern:*

Be it known that ELIZABETH HAWKS, formerly residing at the town of Vineland, in the county of Cumberland, and State of New Jersey, has heretofore invented certain new and useful Improvements in Stoves, and which also may be applied to furnaces or heaters, and for which Letters Patent of the United States of America were granted and issued, in due form of law, bearing date the 1st day of December, 1868, which Letters Patent were, on the 13th day of January, 1869, duly assigned and transferred unto WILLIAM E. MARSTON, of the city of Troy, county of Rensselaer, and State of New York, who is sole assignee, and who executes this specification, and description, and claim upon said invention and improvements.

The said Letters Patent having been found to be defective, in that they do not cover and embrace, in the claims and specifications thereof, all of the original invention and improvements contained in the drawings first and originally filed in the United States Patent Office, and I, the said assignee, being now desirous to reissue, as by law provided, the said Letters Patent, herewith surrendered, have prepared these specifications, drawings, and claims of the said original invention and improvements.

Now, therefore, I, the said sole assignee, do hereby declare that the following is a full, clear, exact, and more perfect description of the said invention and improvements, mentioned and contained in the claims hereto annexed, as well as of the construction, arrangement, and operation of the same, reference being hereby had to the accompanying drawings, and to the letters of reference marked thereon, as a part thereof.

Like letters represent and refer to like or corresponding parts of the said invention and improvements.

Figure 1 represents a vertical section of a coal-burning or heating stove, containing the said invention and improvements, on a vertical line through the centre of the exit pipe and door, or damper in the base of said stove, and which contains the upper combustion chamber, the fuel, or fire chamber, the lower combustion chamber, the chambers and damper in the base thereof, and the rear combustion-chamber, and the radiating-chamber, each and all of which are more fully described and set forth hereinafter.

Figure 2 is a vertical section on a line, A B, fig. 5, showing the same parts of the invention and improvements as contained in fig. 1, and showing the reversed draught, and the state, condition, or process of the combustion, with the direct draught shut off, and the downward draught, caused thereby, in full operation, in the manner substantially as herein described and set forth.

Figure 3 is a vertical section at right angles of the vertical line, figs. 1 and 2, and on the line E F, fig. 5, and showing the damper arranged in the partition in the base of the stove, and also the damper in the inner cylinder wall, or partition, and above the fuel, or fire chamber, and communicating with the upper combustion chamber, each of which is more fully described and set forth hereinafter.

Figure 4 is a section, showing the base on the line C D, at fig. 1.

Figure 5 is a section, on a line at G H, fig. 3, and showing the arrangement of the radiator above the base, and more fully described hereinafter.

Figure 1:
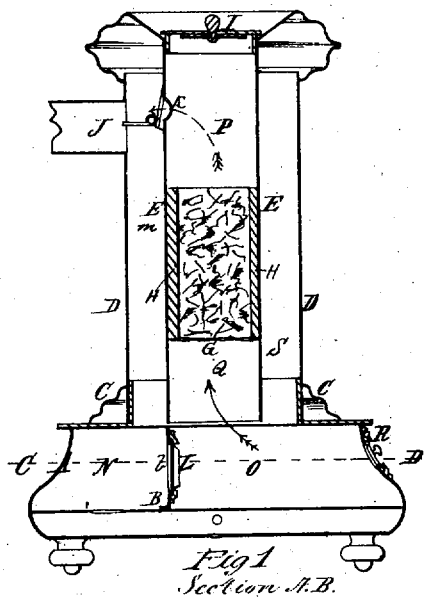
Figure 2:
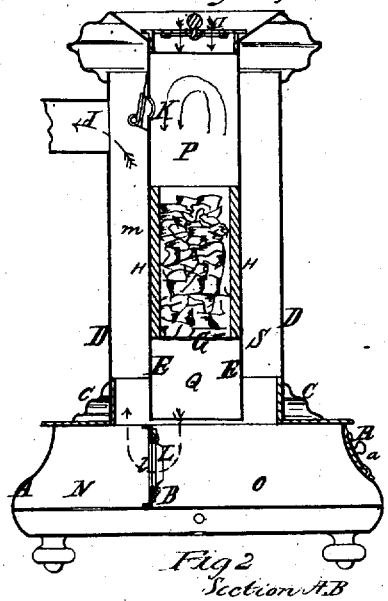

The direct draught is shown at fig. 1, and the reversed draught is shown at fig. 2, in red lines and color, &c., and each of said draughts will be more fully described hereinafter.

The nature of the said invention and improvements herein contained and set forth, consists of an arrangement of the fuel, or fire chamber between an upper and a lower chamber of combustion of the evolving and escaping gases and smoke, produced from combustion of the fuel in the fuel, or fire chamber, in the manner and by the means substantially as herein described and set forth.

It also consists in the employment and arrangement of a double or single damper below the lower combustion chamber, and within a suitable partition plate in the base of a stove, furnace, or heater, in the maaner and for the purposes substantially as herein described and set forth.

It also consists in the employment and arrangement of a vertical radiating chamber and a vertical gas and smoke-combustion chamber, each being arranged and combined with other parts or features of the said stove, furnace, or heater, in the manner and for the purpose substantially as herein described and set forth.

It also consists in the employment and arrangement of a downward-draught damper upon the top of the said stove, furnace, or heater, and immediately over the upper combustion-chamber, in the manner and for the purposes substantially as herein described and set forth.

It also consists in the employment and arrangement of a single or double damper in the inner cylinder wall, and communicating with the upper combustion chamber, and with the vertical and rear gas and smoke-consuming or combustion-chamber, in the manner and for the purposes substantially as herein described and set forth.

It also consists in the construction and arrangement of a stove, furnace, or heater, by which the gases and smoke are caused to rise from the burning fuel in the fire chamber, into an upper chamber of combustion, and then coming into contact with the atmospheric air entering such chamber, at the top of the same, are returned into and through the fire in the fuel chamber, and through spaces, in the fire grate, into a lower gas and smoke-consuming or combustion chamber, and thence, through a suitable damper, in the base of such stove, furnace, or heater, and into a vertical gas and smoke-consuming or combustion chamber, thereby heating the base thereof, and causing nearly all, if not all the escaping products of combustion to be consumed or burned, in the manner and by the means substantially as herein described and set forth.

Having thus described the nature of the said original invention, made by the said ELIZABETH HAWKS, and to me duly assigned and transferred, as aforesaid, and to enable others skilled in the art to which the said invention and improvements appertain, to manufacture and to use the same, I will now and here proceed to describe the construction, arrangement, and operation thereof, referring to the accompanying drawings, which form a part of these specifications, which are substantially as follows; that is to say—

A represents the base of the said stove, furnace, or heater, which is divided into two chambers, by means of the partition B, constructed and arranged in some suitable manner.

Figure 3:
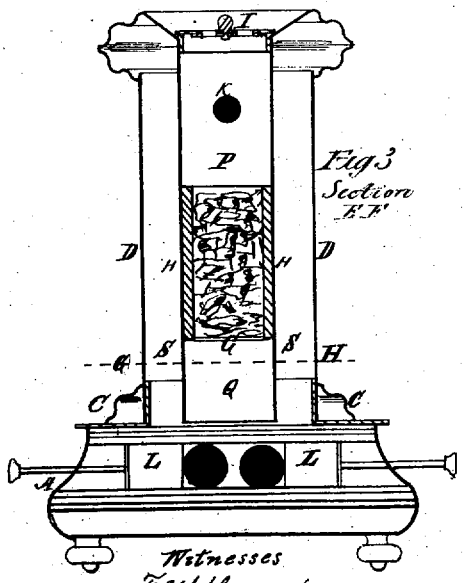
Figure 6:
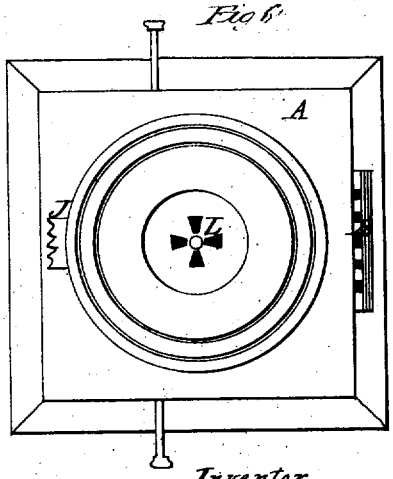
Figure 6 is a view on the top part of figs. 1, 2, and 3, showing the circular damper for the admission of atmospheric air to the upper combustion chamber, and thence downward into and through the fuel, or fire chamber, in the manner and for the purposes substantially as herein described and set forth.

The top of said base A is provided with a circular or other-shaped hole or opening, from which projects a suitable flange, C, figs. 1, 2, and 3, also fig. 5, which flange is for the purpose of receiving the lower end of the outer casing or cylinder D.

The inner cylinder E, figs. 1, 2, 3, and 5, may be supported at its lower end, in a manner similar to that shown in relation to the said outer cylinder D.

By means of the said outer and inner cylinders, an air space or air chamber is formed between the two, which shall be of the same height as that of the said outer and inner cylinders; and the said cylinders are connected, at the rear side, or near thereto, by means of two flue or partition plates, F F, fig. 5, and thus and thereby form a flue or chamber M, figs. 1 and 2, and which corresponds to the opening leading to the rear chamber N, figs. 1, 2, and 4, of the base A, substantially as shown at said figures of the accompanying drawings.

The said chamber or flue M, I denominate a rear vertical combustion chamber, for the consumption or burning of the escaping products of combustion in the manner substantially as herein described and set forth. There will be full and free communication between said chambers M and N.

The said chamber N may be of any form or capacity desired, and is also a combustion and radiating-chamber.

The said chamber N is separated from the chamber O, in the said base A, by means of a partition plate, B, figs. 1, 2, 3, and 4, which partition plate contains a suitable damper, L, which may be constructed in two parts, as shown at fig. 3, if deemed best so to do, and is for the purpose of closing or opening the holes or apertures *b b*, when so required, during the operation of the said stove, furnace, or heater, where said invention and improvements are applied.

The said damper L may be of any size or capacity desired, or in any form.

Inside of the said inner cylinder E, is the fuel, or fire chamber H, which is provided with some suitable fire grate G.

The said chamber is supplied with the fuel from the top of the stove, through some suitable opening, which may be opened and closed by convenient means.

The chamber between the said inner and outer cylinders D and E, is closed at the top thereof, by means of a suitable plate, constructed for that purpose, as well as for the top plate of the stove, and it may be of any form or shape desired.

The top of the inner cylinder E is closed by the cover I, which is provided with draught openings or holes, that may be opened and closed, as the case may require, during the operation of the stove, furnace, or heater, and the same also forms the covering for the upper part of the upper combustion chamber P, figs. 1, 2, and 3.

At the rear side of the said inner cylinder E is a suitable opening, near the top, through which the smoke passes out, and into the pipe (called the exit pipe) J.

The said opening in said inner cylinder E may be closed or opened, for the purposes herein named, by means of the damper K.

When open for the purpose of starting up the fire or combustion of the fuel in the fuel chamber H, then the smoke will pass out and into the said exit pipe, and while this is going on, I call the same by the following words, to wit, the direct draught.

When the fuel aforesaid, has become thoroughly ignited, so as to evolve the gases and smoke, then said damper K is closed, so as to produce the return or downward draught, substantially as herein described and set forth.

The fuel chamber H has fire-brick lining, if deemed best to use the same, and when not so used, then I use heavy cast-iron plates or cylinders, as the case may require.

The said fuel chamber H is so arranged, as to constitute what is denominated the lower combustion chamber Q, figs. 1, 2, and 3, and which chamber will be constructed of any capacity required, the same being always below the fire grate G, and above the top of the base, A, or suitably arranged in connection with the said chamber O, and thus and thereby, and by means thereof, contribute towards the preservation of the said fire grate G from too rapid burning out, by the combustion of the fuel thereon, or by the combustion of the escaping products of combustion, that is to say, the gases and smoke evolved from the fuel in said fuel chamber.

R, figs. 1, 2, and 4, is a damper in the front part of the chamber O and base A. This damper must be opened when it is necessary to use the direct draught for the kindling or starting of the fire in the fuel chamber H.

The direct draught is indicated by the arrows at fig. 1, while the reversed or return draught is shown by the red arrows at fig. 2.

The dark-colored arrows at fig. 2, indicate the atmospheric air passing in and through the register, or damper I, at the top of the stove, furnace, or heater, which is open to any required capacity, when the return or reversed draught is in force or operation, substantially as shown at said fig. 2.

The said damper R may be constructed in any form desired, and it may be a sliding or revolving damper.

R′, fig. 4, is a door in the front part of the base A, and it is for the purpose of allowing the withdrawing or removing of the ashes, or ash-pan containing ashes, at such times as it shall become necessary.

The said damper R may be constructed in the said door R′, or it may be upon other sides of said chamber O in said base A.

When it is desirable to use the return draught shown at said fig. 2, it will become necessary to close the said damper R, also to close the said damper R in the said upper chamber of combustion P, and to open the damper, or register I at the top, and over the said upper combustion chamber P, and the gases and smoke being evolved from the fuel in the fuel chamber H, will arise within the said upper combustion chamber P, and coming into contact with the atmospheric air entering the said chamber through the said damper, or register I, are borne downwards towards the fire in the said fuel chamber, and such of said gases and smoke as remain unconsumed, are thrown into, downward, and through the fire in said fuel chamber, where, and by means of which, the same are still more consumed, and such as still remain unconsumed, are passed into the lower combustion chamber Q below the said fire grate G, and coming into contact with the hot air within said chamber, the more perfect combustion of said smoke and gases is continued, while those yet remaining unconsumed, pass onward through the said damper L, in the said partition plate B, into the said rear chamber N, in the said base, and passing from said chamber upward into the rear chamber M, the same will come into contact with highly heated atmospheric air within said chamber, and the said gases and smoke or products of combustion yet remaining unconsumed, will be vigorously ignited and consumed within said vertical rear combustion chamber M.

The said direction of escaping products of combustion, and the consumption of the same, while and during efforts to escape to the exit pipe J, are fully indicated by the red arrows at fig. 2, as aforesaid.

It will be seen that there are at least four points or places of combustion of the evolved gases and smoke; that is to say, first, in the upper chamber of combustion P; second, in the fuel chamber H; third, in the lower combustion chamber Q; and fourth, in the rear and vertical combustion chamber M; the operation being carried on in the manner substantially as shown at the said fig. 2.

By the arrangement of chambers for the combustion of the fuel and of the evolving gases and smoke, the said fire grate G, at the bottom of the fuel chamber, and on which the fuel rests, will endure the heat for a much longer time than heretofore known.

When a double damper is used, it will be constructed substantially as shown at L L, fig. 3. The same kind of damper may be used to allow communication from the upper combustion chamber P, and the exit-pipe J, figs. 1, 2, and 3.

In the front, and partially upon the sides of the said stove, furnace, or heater, and on the sides of the said upper, and lower, and fuel chambers, will be arranged and constructed, the radiating chamber S, figs. 1, 2, 3, and 5, which extends from the top of said base A, up to the full height, or nearly so, of said stove, furnace, or heater, substantially as shown at said figs. 1, 2, and 3. In this chamber the air becomes very highly heated by means of the said combustion and fuel chambers, Q, H, and P.

Atmospheric air from the room where said stove is used, may be admitted into the said radiating chamber, at or near the lower part of the same, and passing upward in the said chamber, along the side of, and in contact with the said inner cylinder E, will become heated, and then and thereafter returned in said room, at the upper part of the said radiator or radiating chamber S, by some suitable opening therein constructed and arranged, and which may be done by means of suitably constructed slides, or dampers, or valves.

The said stove, furnace, or heater, may of course be constructed of any capacity required or desired.

The said register or damper, at the top of the said upper combustion chamber P, may be of any form, shape, or capacity in any case required, and above and around the same may be arranged some suitable ornament or design.

As much of said stove, furnace, or heater as possible may be constructed of cast iron, and the remainder of good and substantial sheet iron, save that part made of fire-brick, when found necessary to use fire brick.

The whole structure may, of course, be suitably ornamented by suitable designs, &c. When the fire is made in the stove, and the draught-holes *a a* in the damper R in the front of the base A, open, the smoke and escaping products of combustion pass out through the hole in the inner cylinder, and through the pipe J, the damper K being open, and the draught openings in the cover or top of the stove being closed, substantially as aforesaid.

The lower part of the said base A is not much heated, while such operation of dampers and draught is going on, but when it is desired to heat that part, then the said draught holes *a a* must be closed, and the said openings or damper, in said cover or top of the stove, thrown open to any desired capacity, for admission of the air.

It will then be seen that the heat, smoke, and the heated products of combustion remaining unconsumed, will pass downward into the front chamber of the base A, thoroughly heating the same, while the process of combustion goes on therein in the manner substantially as aforesaid.

The aforesaid dampers are each and all operated, when desired, by a suitable connecting rod combined therewith.

The entire height of the stove, furnace, or heater above the said base A, is usually divided into three equal parts.

The fuel and fire chamber H will generally occupy about one-third of such height, and is placed in the centre, between the said upper and lower combustion chambers, that is to say, P and Q, substantially as shown at the said figs. 1, 2, and 3, but the said upper combustion chamber P may be of greater capacity than that of said lower combustion chamber Q, if deemed best so to do. The said lower chamber Q may communicate with the said chamber *o* in the base, A, in or by any suitable means or manner. The said lower combustion chamber Q may extend downward into the said base, A, or chamber *o* therein, and then have upon its lower end a damper, to be used in the place and stead of the said partition plate B, and damper therein, and the operation will then be substantially the same as when the said vertical partition plate B, with damper therein, is used in the manner and for the purposes aforesaid.

The said fire grate G may or may not be a dumping grate. The usual fire-grate may be used, which will both vibrate or shake and dump.

The said fuel chamber H may be supported between said upper and lower chambers, P and Q, of combustion, in any good and convenient manner, and by any suitable mechanical means, which will of course support the fire brick and fire grate in their proper place and condition.

Stoves, furnaces, or heaters constructed upon the plan, principle, and containing the features herein set forth, are cheap, durable, and certain, efficient in operation, as well as economical in the use of fuel.

Having thus described the nature, construction, and operation of the original invention and improvements in stoves, furnaces, and heaters made by ELIZABETH HAWKS, and to me assigned, as aforesaid,

What I claim as her invention and improvements, is—

1. The base, A, constructed substantially as herein described and set forth, with a partition, B, or any equivalent therefor, thereby dividing said base into two chambers, which partition is provided with suitable openings or apertures, *b b*, and with the slides or damper L, substantially as and for the purposes herein described and set forth.

2. The arrangement of the outer, or surrounding cylinder, D, and of the inner cylinder, E, when used in combination with vertical partition plates F, whereby a flue space, or chamber, M, is formed for the passage of the smoke, and also for the passage and consumption of any escaping unconsumed gases or products of combustion, and which also form a radiating chamber, S, in the front of such rear vertical chamber M, in the manner substantially as herein described and set forth.

3. The combination of the base chamber *o* with the intermediate combustion chamber Q and with the rear base chamber N, by the means of the partition B, having therein the damper L, or any other equivalent therefor, the whole being arranged and operated in the manner substantially as herein described and set forth.

4. The downward-draught damper I, constructed and arranged upon the top of the inner cylinder, E, when used in combination with the upper combustion-chamber, P, with the fuel chamber H, lower or intermediate combustion chamber Q, the chamber *o* in the front of the base, A, lower and base damper L, the rear chamber N in the rear part of the base, A, and with the rear vertical chamber M, each operating in the manner and for the purposes substantially as herein described and set forth.

5. The arrangement and combination of the cylinders D and E and the upright plates F F, thereby forming a flue or chamber for the passage of any escaping products of combustion from the consuming fuel, and also, and thus, and thereby forming in the front of such flue or chamber, and between said cylinders, a hot-air chamber for the radiation of the heat, in the manner substantially as herein described and set forth.

6. The double and sliding dampers L′L, when constructed, combined, and operated in a stove, furnace, or heater, in the manner and for the purposes substantially as herein described and set forth.

In testimony whereof, I have, on this 20th day of January, A. D. 1869, hereunto set my hand, in the presence of two witnesses.

WM. E. MARSTON.

Witnesses:

MARCUS P. NORTON,

R. H. REILLE.